Dec. 9, 1924.

W. H. WORRALL ET AL

WHEEL FOR MOTOR AND OTHER VEHICLES

Filed Feb. 2, 1922

1,518,290

INVENTORS
William H. Worrall
Ralph D. Flunder
BY Wm Wallace White ATTY.

Patented Dec. 9, 1924.

1,518,290

UNITED STATES PATENT OFFICE.

WILLIAM HENLEY WORRALL AND RALPH DANIEL FLUNDER, OF LETCHWORTH, ENGLAND, ASSIGNORS TO THE WEB WHEEL COMPANY LIMITED, OF LETCHWORTH, ENGLAND.

WHEEL FOR MOTOR AND OTHER VEHICLES.

Application filed February 2, 1922. Serial No. 533,608.

*To all whom it may concern:*

Be it known that we, WILLIAM HENLEY WORRALL, of Nellore, Commerce Avenue, and RALPH DANIEL FLUNDER, of Baldock Road, both of Letchworth, in the county of Hertford, England, and both subjects of the King of Great Britain and Ireland, have invented certain new and useful Improvements in or relating to Wheels for Motor and other Vehicles, of which the following is a specification.

This invention relates to disc wheels for motor and other road vehicles.

The object of this invention is to intercept the transmission and minimize the intensification of sounds emitted from the mechanism of a vehicle, also to prevent the reflection of other noises which are directed upon the disc of the wheel from external sources such as the engine and further, to reduce the weight in relation to the strength of the wheel and to this end our invention consists in the provision of means within the wheel for attaining this object and further consists in the method of and means hereinafter described for carrying the invention into effect.

A wheel made in accordance with this invention comprises a web or disc of material or a combination of material possessing low or no sound conducting properties and being of a non-vibratory and in some cases non-metallic nature, adapted to be secured to the rim, the centre of the disc forming the nave of the wheel and being detachably secured to the hub and means comprising reinforcing members adapted to secure said disc to the rim.

Referring to the drawings filed herewith,

Figure 2:
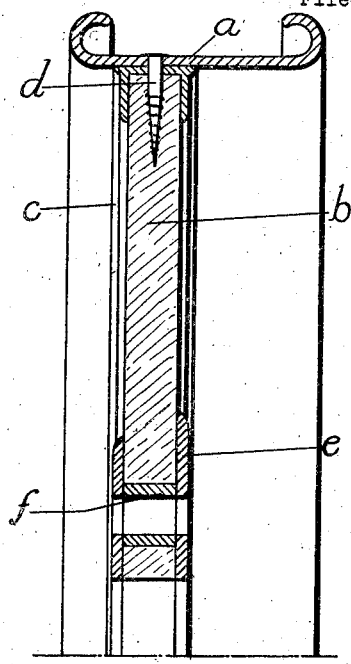
Fig. 2 is a part sectional view to an enlarged scale.
Figure 1:
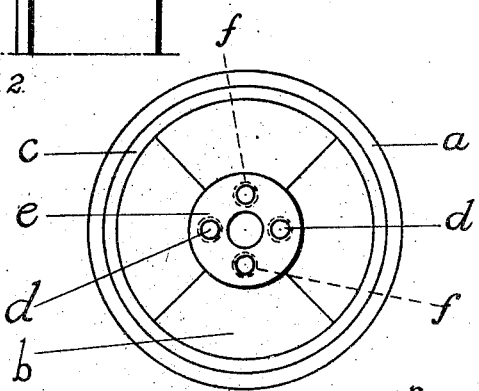
Fig. 1 is an elevation of one form of wheel made in accordance with this invention.

In Figs. 1 and 2, $a$ is the rim of the wheel and $b$ a disc of plywood, fibre or the like disposed within a reinforcing member in the form of a metallic hoop $c$ secured to the rim by sweating or welding and by bolts or set screws $d$ also adapted to secure the plywood disc. The disc $b$ is provided with nave plates $e$ and bushes $f$ for securing the hub thereto.

Figure 3:
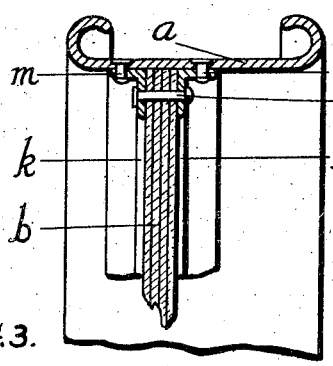
Figs. 3 and 4 are similar part sectional views showing modified forms of wheels.

In Fig. 3 the disc $b$ is of laminated form and held between two annular members $k, k$ of angle iron or the like, bolts $m, m$ securing them to the rim and bolts $n$ passing through the disc $b$ and securing it to the annular members $k, k$.

Figure 4:
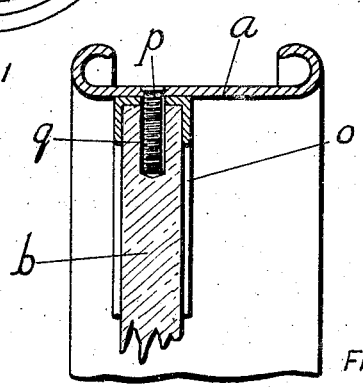

In Fig. 4, a hoop $o$ of channel section is employed in which the disc $b$ is disposed. Set screws $p$ engage liners $q$ in the disc $b$ thus securing said disc and hoop $o$ to the rim.

In use, the disc $b$ being of a non-vibratory nature and having low sound conducting properties, takes up vibration and sound waves from various sources both from the mechanism of the vehicle and externally, thereby preventing their reflection and subduing or minimizing the intensification thereof.

The disc may be built up in segments as shown in Fig. 1 if desired.

What I claim and desire to secure by Letters Patent is:—

1. In a vehicle wheel, in combination, a rim flanged to hold pneumatic tires, an annular channelled member secured to said rim and offset from the centre thereof to give easy access to the valve and a non-vibratory disc device seated and secured within said channelled member.

2. In a vehicle wheel, in combination, a rim flanged to hold pneumatic tires, an annular channelled member secured to said rim and offset from the centre thereof to give easy access to the valve, and a non-vibratory disc member consisting of a plurality of contiguous discs seated and secured within said channelled member.

In testimony whereof we have signed our names to this specification.

WILLIAM HENLEY WORRALL.
RALPH DANIEL FLUNDER.